Patented Dec. 14, 1926.

1,610,747

UNITED STATES PATENT OFFICE.

EARL G. COLTON, OF LINCOLN, NEBRASKA.

LUMINOUS PAINT AND METHOD OF MAKING THE SAME.

No Drawing.  Application filed November 16, 1921. Serial No. 515,569.

This invention relates to an improved luminous paint and method of making the same.

The object of the invention is to provide an improved weather proof luminous paint susceptible of general use, but particularly adapted to be employed outside, to surfaces exposed to the weather, especially advertising signs, road signs, signals, etc.

A further object of the invention is to provide an improved composition of this nature, strongly luminous, possessing to a high degree the quality of absorbing light rays or phosphorescence induced by the sun's rays, that will retain its weather proof, luminous characteristics over a long period of time and that can be cheaply produced.

The invention, with other objects and advantages thereof will be understood from the following detailed description.

My improved composition consists of a mixture including a precipitated zinc sulphide containing a fixed proportion of a substance, such as sodium vanadate; sodium chloride; a relatively small amount of a mixture of meso-thorium and radio-thorium, a suitable coloring material or pigment, and a weather proof vehicle or carrier.

In making the paint, the sodium vanadate, or like substance, is introduced into the original zinc salt solution, preferably zinc chloride solution, in the proportions of 50 cubic centimeters of a 1/1000 molar vanadium solution to 300 cubic centimeters of molar zinc solution. By a molar zinc solution I mean a solution containing such a proportion of a zinc salt, that the number of grams of zinc present in one liter of water is expressed by the integers in molecular weight of zinc. Zinc chloride, zinc carbonate or other zinc salts may be employed, so long as the amount of salt required to keep the zinc content constant is present. Zinc chloride, however, is preferred as giving the most satisfactory results. Ammonium sulphide is preferably employed as the precipitating agent, the precipitated zinc sulphide obtained in this way being easily filterable. During precipitation, the zinc salt is maintained in slightly excess of the amount that the ammonium sulphide will precipitate. After precipitation and filtration, the precipitate is dried without washing. The precipitate contains zinc sulphide primarily, a small amount of sodium vanadate, and probably some zinc chloride, since that salt was kept in excess during the precipitation. With the proportions hereinbefore stated about 29.22 gr. of zinc sulphide will be precipitated. The precipitate is then mixed with a relatively small amount of sodium chloride, about 1.5 grams of sodium chloride being used with the specific proportions given.

The mixture is heated in a muffle furnace at 750 degrees centigrade or thereabout for substantially one hour, or subjected to a sufficient heat treatment to produce a semi-crystalline condition. After heating, some reaction takes place and a film of zinc chloride forms around the zinc sulphide. This reaction does not result in the complete change of sulphide to chloride since the amount of sodium chloride present is not great enough to react with all of the zinc sulphide, the reaction being comparatively slight. The resultant semi-crystalline zinc sulphide contains within it a small amount of the sodium vanadate and possibly some zinc chloride, the whole being coated with a film of zinc chloride, this zinc sulphide constituting the body of the luminous compound in the composition.

After the heat treatment, the meso-radio-thorium mixture (three parts meso to two parts radio) in a crushed condition, is added in the proportion of three milligrams of meso-radio-thorium to ten grams of zinc sulphide. Next is added any suitable coloring material in the proper proportion for the purpose. Any of the usual pigments, white lead, ocher, barium sulphate, etc., may be employed. The whole is then thoroughly mixed with the weather proof vehicle or carrier.

The weather proof carrier employed consists of 100 parts resin, 20 parts crystallized soda and 50 parts water. The mixture is heated and mixed with a solution of 240 parts water and 22 parts aqua ammonia.

The sodium vanadate or like agent is introduced into the original zinc salt solution before precipitation, a more thorough and even distribution of the same throughout the precipitate being obtained in this way than is possible by mechanical mixing.

The use of sodium vanadate or like substance in the composition results in a material increase in the strength of the phosphorescence of the zinc sulphide. The degree and length of the heat treatment is also instrumental in producing this result, and the sodium chloride content also adds strength and intensity to the phosphorescence.

The special vehicle or carrier is weather proof and translucent. It has a less deleterious effect on radio active substances than oils, and can be made for about one-third less than the average weather proof varnish.

The resultant composition is weather proof and strongly luminous, due to the fact that it possesses to a high degree the quality of phosphorescence, and also on account of its luminescence due to radio-activity of the meso-radio-thorium. The composition is comparatively inexpensive to produce, it will retain its luminescent and weather proof characteristics over a long period of time. After long usage the radioactivity of the thorium can be renewed by heating, so that by saving the old pigments scraped from painted surfaces, the radioactive element can be renewed and used over again.

The improved luminous paint is useful for many purposes. It is particularly adapted for use on surfaces exposed to the weather, sign boards, advertising signs, various kinds of signals, road direction signs, safety first signs, marine signs, etc., also upon other objects including golf balls.

In some instances, if desired, after the luminous paint has been applied, the painted surface may be provided with an outer coating or layer of the weather proof vehicle, the translucent nature of the vehicle making it especially adapted for this purpose.

It will be understood that the specific proportions hereinbefore stated are given by way of example and that in practicing the invention, they of course may be varied within certain limits. Zinc chloride, zinc carbonate or other zinc salts may be employed, before precipitation, and manganese and titanium, may be used as substitutes for vanadium.

What I claim is:

1. A luminous paint composition consisting of a mixture including a large proportion of a precipitated zinc sulphide, a small proportion of sodium chloride, and a relatively small amount of a mixture of meso-thorium and radio-thorium.

2. A luminous paint composition consisting of a mixture including a large proportion of a precipitated zinc sulphide, a small proportion of sodium chloride, a relatively small amount of a mixture of meso-thorium and radio-thorium, and a weather proofing vehicle.

3. A luminous paint composition consisting of a mixture including a large proportion of a precipitated zinc sulphide, a small proportion of sodium chloride, a relatively small amount of a mixture of meso-thorium and radio-thorium, the zinc sulphide being precipitated from solution of zinc chloride.

4. A luminous paint composition consisting of a mixture including a large proportion of a precipitated zinc sulphide, a small proportion of sodium chloride, a relatively small amount of a mixture of meso-thorium and radio-thorium, a small proportion of coloring pigment, and a weather proofing vehicle.

5. A luminous paint composition containing a large proportion of a precipitated zinc sulphide, a small proportion of sodium chloride, a relatively small proportion of a mixture of meso-thorium and radio-thorium, and a weather proofing carrier of a resinous nature.

6. A luminous paint composition containing a large proportion of a precipitated zinc sulphide, a small proportion of sodium chloride, a relatively small amount of a mixture of meso-thorium and radio-thorium, a small proportion of coloring pigment, and a weather proofing carrier of a resinous nature.

7. A luminous paint consisting of a mixture including a large proportion of a precipitated zinc sulphide, a small proportion of a substance increasing the phosphorescence of the zinc sulphide, a small proportion of sodium chloride, and a relatively small amount of a mixture of meso-thorium and radio-thorium.

8. A luminous paint composition consisting of a mixture including a large proportion of a precipitated zinc sulphide, a small proportion of sodium vanadate, a small proportion of sodium chloride, and a relatively small amount of meso-thorium and radio-thorium.

9. A luminous paint composition consisting of a mixture including a large proportion of a precipitated zinc sulphide, a small proportion of a substance increasing the phosphorescence of the zinc sulphide, and a small proportion of sodium chloride.

10. A luminous paint composition consisting of a mixture including a large proportion of a precipitated zinc sulphide, a small proportion of sodium vanadate, a small proportion of sodium chloride, and a relatively small amount of meso-thorium.

11. A luminous paint composition consisting of a mixture including a large proportion of a precipitated zinc sulphide, a small proportion of sodium vanadate, and a small proportion of sodium chloride.

12. A luminous paint composition consisting of a mixture including a large proportion of a precipitated zinc sulphide, a small proportion of sodium vanadate, and a relatively small amount of a mixture of meso-thorium and radio-thorium.

13. A luminous paint compound consisting of a mixture including a large proportion of a precipitated zinc sulphide, a small proportion of a substance increasing the phosphorescence of the zinc sulphide, and a relatively small amount of a mixture of meso-thorium and radio-thorium.

14. The method of making luminous paint including the mixing of a precipitated zinc sulphide with sodium chloride, and subjecting the mixture to heat sufficient to produce a semi-crystalline condition.

15. The method of making luminous paint including the mixing of a precipitated zinc sulphide with sodium chloride, and subjecting the mixture to heat sufficient to produce a semi-crystalline condition, and then adding a mixture of mesothorium and radio-thorium.

16. The method of making luminous paint including introducing sodium vanadate into an original zinc salt solution, precipitating the zinc sulphide from solution, mixing sodium chloride with the precipitate, and subjecting the mixture to heat sufficient to produce a semi-crystalline condition.

17. The method of making luminous paint including introducing sodium vanadate into an original zinc salt solution, precipitating the zinc salt solution, mixing sodium chloride with the precipitate, and subjecting the mixture to heat sufficient to produce a semi-crystalline condition, then adding a mixture of meso-thorium and radio-thorium.

18. A luminous paint composition consisting of a mixture including a large proportion of a precipitated zinc sulphide, a small proportion of sodium chloride, a relatively small amount of a mixture of meso-thorium and radio-thorium, and a water proofing vehicle in sufficient quantity and consisting of resin and crystallized soda.

19. A luminous paint composition consisting of a mixture including a large proportion of a precipitated zinc sulphide, a small proportion of sodium vanadate, a small proportion of sodium chloride, a relatively small amount of a mixture of meso-thorium and radio-thorium, and a water proofing vehicle in sufficient quantity and consisting of resin and crystallized soda.

20. The method of making luminous paint including the mixing of precipitated zinc sulphide with sodium chloride and subjecting the mixture to heat sufficient to produce a coating of zinc chloride on the sulphide.

21. The method of making luminous paint including introducing sodium vanadate into an original zinc salt solution, precipitating the zinc sulphide from solution, mixing sodium chloride with the precipitate, and subjecting the mixture to heat sufficient to produce a coating of zinc chloride on the zinc sulphide.

22. The method of making luminous paint including introducing sodium vanadate into an original zinc salt solution, precipitating the zinc salt solution, mixing sodium chloride with the precipitate, and subjecting the mixture to heat sufficient to produce a coating of zinc chloride on the zinc sulphide, and then adding a mixture of meso-thorium and radio-thorium.

23. A luminous paint composition consisting of a mixture including a large proportion of a precipitated zinc sulphide, a small proportion of sodium vanadate, a small proportion of sodium chloride heated to produce a coating of zinc chloride on the zinc sulphide, and a mixture of meso-thorium and radio-thorium.

24. A luminous paint composition consisting of a mixture including a large proportion of a precipitated zinc sulphide, a small proportion of sodium chloride, and a small proportion of meso-thorium.

25. A luminous paint composition consisting of a mixture including a large proportion of a precipitated zinc sulphide, a small proportion of sodium chloride, and a small proportion of radio-thorium.

In testimony whereof I hereunto affix my signature.

EARL G. COLTON.